United States Patent
Kim

(10) Patent No.: US 10,281,761 B2
(45) Date of Patent: May 7, 2019

(54) LIQUID CRYSTAL DISPLAY DEVICE

(71) Applicant: LG Display Co., Ltd., Seoul (KR)

(72) Inventor: Jin Kim, Incheon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/194,075

(22) Filed: Jun. 27, 2016

(65) Prior Publication Data

US 2016/0377915 A1 Dec. 29, 2016

(30) Foreign Application Priority Data

Jun. 25, 2015 (KR) ........................ 10-2015-0090675

(51) Int. Cl.
*G02F 1/1335* (2006.01)
*G02F 1/1339* (2006.01)
*G02F 1/1343* (2006.01)

(52) U.S. Cl.
CPC .... *G02F 1/133512* (2013.01); *G02F 1/13394* (2013.01); *G02F 1/134363* (2013.01)

(58) Field of Classification Search
CPC ............. G02F 1/136209; G02F 1/1339; G02F 1/134363

See application file for complete search history.

(56) References Cited

U.S. PATENT DOCUMENTS

2005/0041182 A1* 2/2005 Ono .................. G02F 1/134363
349/106
2012/0038867 A1* 2/2012 Kwon ............... G02F 1/133512
349/110

* cited by examiner

*Primary Examiner* — Lucy P Chien
(74) *Attorney, Agent, or Firm* — Fenwick & West LLP

(57) ABSTRACT

Provided is a liquid crystal display device. The liquid crystal display device includes a first sub-pixel configured to represent any one of red, green, and blue; a second sub-pixel adjacent to the first sub-pixel and configured to represent a different color from the first sub-pixel; and a black matrix disposed underneath along a boundary between the first sub-pixel and the second sub-pixel and configured to have a particular width that suppresses color mixture between the first sub-pixel and the second sub-pixel.

10 Claims, 7 Drawing Sheets

LIQUID CRYSTAL DISPLAY DEVICE

CROSS-REFERENCE TO RELATED APPLICATION

This application claims the priority of Korean Patent Application No. 10-2015-0090675 filed on Jun. 25, 2015, the disclosure of which is incorporated herein by reference in its entirety.

BACKGROUND

Field

The present disclosure relates to a liquid crystal display device and a structure thereof.

Description of the Related Art

A liquid crystal display device has a high contrast ratio and is suitable to display a moving image. Further, since power consumption of the liquid crystal display device is low, the liquid crystal display device is utilized in various fields such as a notebook computer, a monitor, or a TV. A molecular structure of a liquid crystal is thin and long. The liquid crystal has an optical anisotropy having a directivity of an orientation and a polarization property by which when the liquid crystal is located in an electric field, an orientation of the molecules changes depending on an intensity of the electric field. Therefore, the liquid crystal display device implements an image using the optical anisotropy and the polarization property of the liquid crystal.

Generally, a liquid crystal display device includes a liquid crystal panel in which a liquid crystal layer is interposed between two opposing substrates to bond the substrates to each other. Electrodes are formed on inner surfaces of two substrates to change an orientation of the liquid crystal molecules by an electric field applied to the two electrodes, thereby causing difference of light transmittances.

The transmittance difference of the liquid crystal panel, light supplied from a backlight which is disposed on a rear surface of the liquid crystal panel passes through the liquid crystal panel. Color composition which is implemented while the light supplied from the backlight passes through a color filter is reflected to display a color image.

A general manufacturing process of a liquid crystal display device may be divided into a substrate manufacturing process which forms an array substrate and a color filter substrate, a cell process which completes a liquid crystal panel, and a module process which integrates the liquid crystal panel and the backlight.

Among the above processes, during the substrate manufacturing process, thin film deposition, photolithography, and etching processes are repeated several times to implement a thin film transistor (TFT) array layer and the color filter layer on each substrate. During the cell process, a seal pattern is formed to be bond onto any one of the TFT array substrate and the color filter substrate, and then two substrates are bonded to be opposite to each other with a liquid crystal layer therebetween, thereby completing the liquid crystal panel. During the module process, a polarizer and a driving circuit are attached onto the liquid crystal panel completed as described above and then the liquid crystal panel is integrated with the backlight to form a liquid crystal display device.

In the meantime, a spacer is provided between the TFT array substrate and the color filter substrate to constantly maintain an interval between the two substrates. The spacer is classified into a ball spacer and a column spacer in accordance with a shape and a disposing method. The ball spacer is formed to be scattered on the array substrate or the color filter substrate and the column space is formed on the color filter substrate through patterning. Recently, a column spacer which is formed in a specific position with a desired shape is widely used.

SUMMARY

An object of the present disclosure is to provide a liquid crystal display device. More specifically, an object of the present disclosure is to provide a liquid crystal display device having a structure which suppresses color mixture between adjacent pixels.

Objects according to an exemplary embodiment of the present disclosure are not limited to the above-mentioned objects, and other objects, which are not mentioned above, can be clearly understood by those skilled in the art from the following descriptions.

According to an aspect of the present disclosure, there is provided a liquid crystal display device. The liquid crystal display device includes: a first sub-pixel configured to represent any one of red, green, and blue; a second sub-pixel adjacent to the first sub-pixel and configured to represent a different color from the first sub-pixel and a black matrix disposed underneath along a boundary between the first sub-pixel and the second sub-pixel and configured to have a particular width that suppresses color mixture between the first sub-pixel and the second sub-pixel.

According to another aspect of the present disclosure, there is provided a TFT array substrate.

The thin film transistor (TFT) array substrate includes: a supporting substrate; display elements disposed on the supporting substrate and provided to display an image; a planarization layer that flattens upper portions of the display elements; and a black matrix on the planarization layer and underneath along a boundary between two adjacent sub-pixels.

According to an exemplary embodiment of the present disclosure, color mixture between adjacent pixels may be efficiently suppressed. Specifically, in a liquid crystal display device according to an exemplary embodiment of the present disclosure, a width of the black matrix is reduced, so that transmittance may be improved as compared with a display device of the related art. Further, an integrated structure of the black matrix and the column spacer according to an exemplary embodiment of the present disclosure may contribute to simplify a process and save a manufacturing cost.

The objects to be achieved by the present disclosure, the means for achieving the objects, and effects of the present disclosure described above do not specify essential features of the claims, and, thus, the scope of the claims is not limited to the disclosure of the present disclosure.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PRESENT EMBODIMENT

Figure 1:
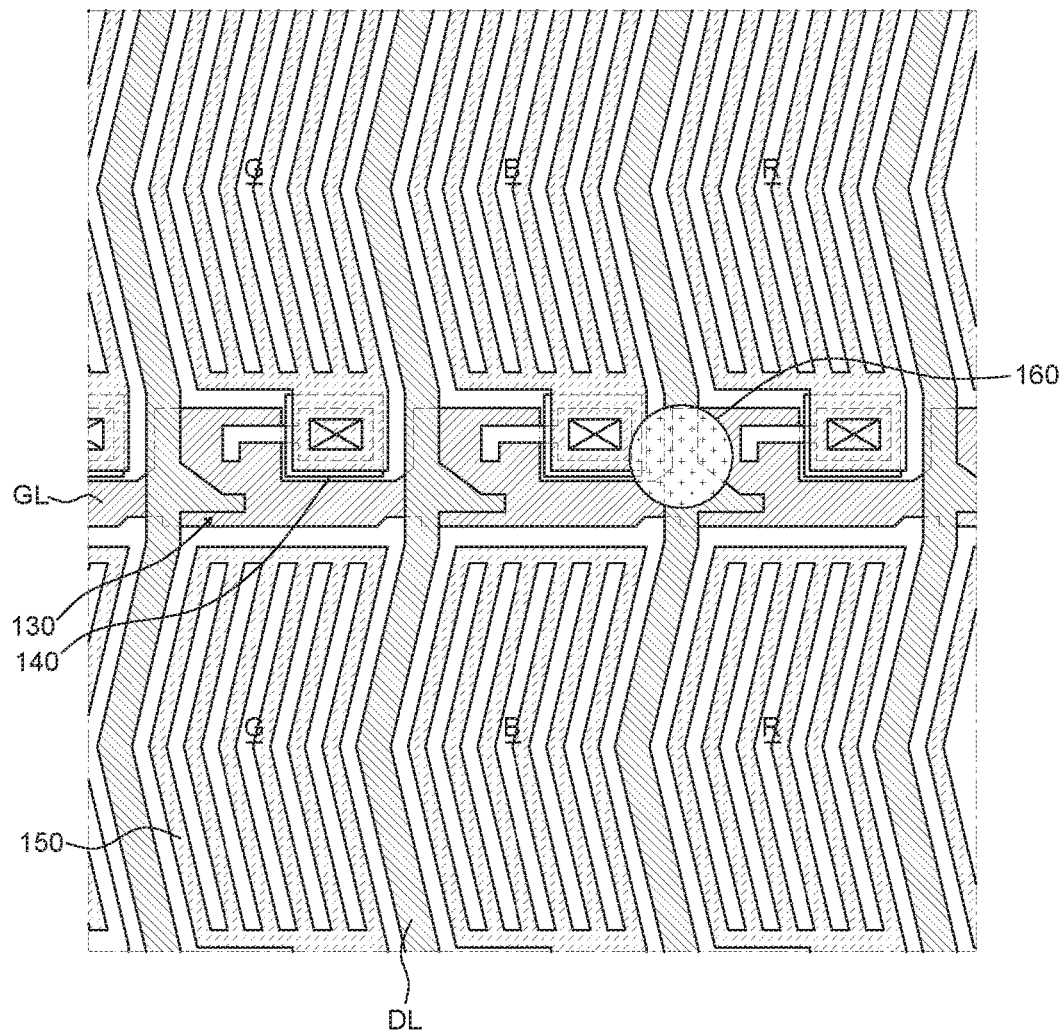
FIG. 1 is a schematic plane view of a liquid crystal display device.

Advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the disclosure, and the present disclosure will be defined by the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification. Further, in the following description, a detailed explanation of known related technologies may be omitted to avoid unnecessarily obscuring the subject matter of the present disclosure.

The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When the relation of a time sequential order is described using the terms such as "after", "continuously to", "next to", and "before", the order may not be continuous unless the terms are used with the term "immediately" or "directly".

Although the terms "first", "second", and the like are used for describing various components, these components are not confined by these terms. These terms are merely used for distinguishing one component from the other components. Therefore, a first component to be mentioned below may be a second component in a technical concept of the present disclosure.

The features of various embodiments of the present disclosure can be partially or entirely bonded to or combined with each other and can be interlocked and operated in technically various ways, and the embodiments can be carried out independently of or in association with each other.

Hereinafter, various exemplary embodiments of the present disclosure will be described in detail with reference to the accompanying drawings.

Figure 2:
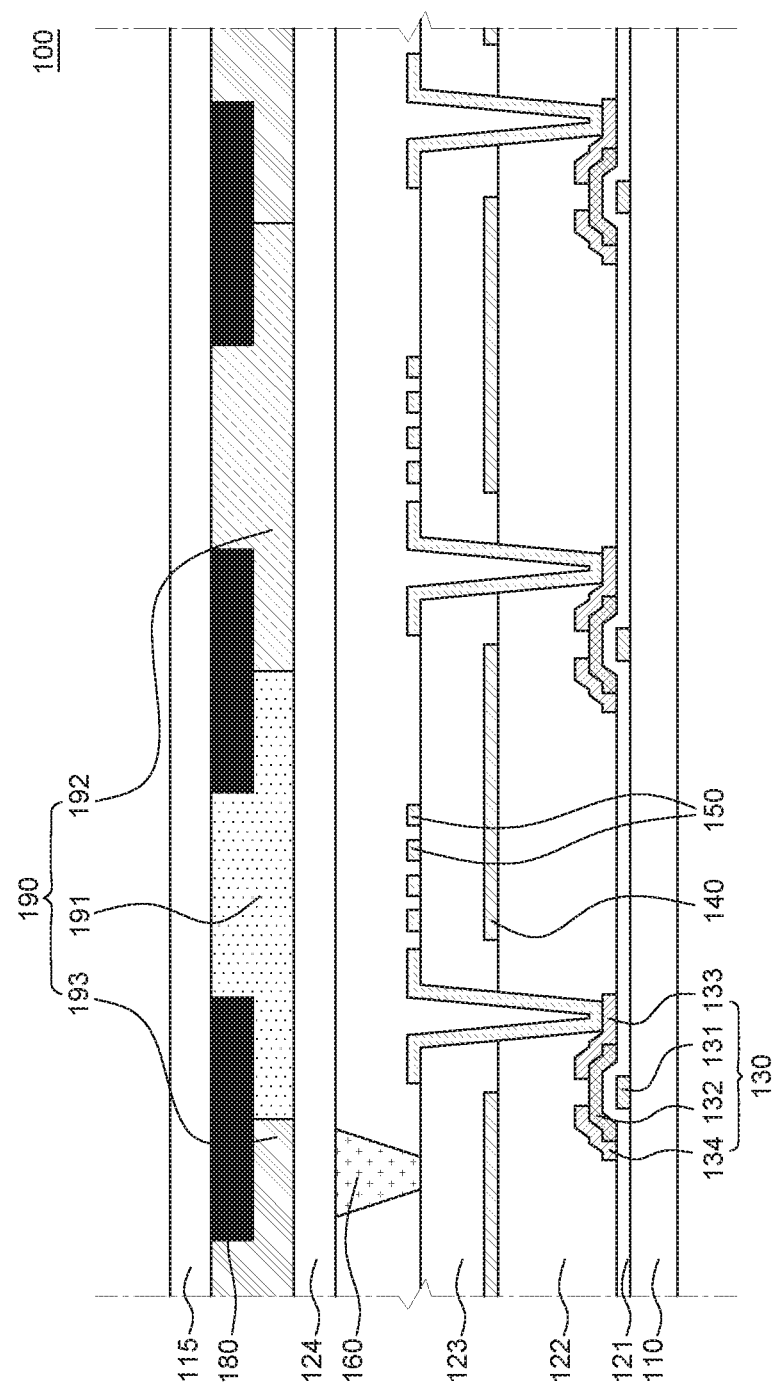
FIG. 2 is a schematic cross-sectional view of a liquid crystal display device.

FIG. 1 is a schematic plane view of a liquid crystal display device and FIG. 2 is a schematic cross-sectional view of a liquid crystal display device.

The liquid crystal display device 100 includes a first substrate (TFT array substrate) 110, a second substrate (color filter substrate) 115, a thin film transistor (TFT) 130, planarization layers 122 and 123, a common electrode 140, a pixel electrode 150, a column spacer 160, and a black matrix 180. For the convenience of description, only some of components of the liquid crystal display device 100 are illustrated in FIG. 1.

The first substrate 110 is an array substrate of the liquid crystal display device 100 and includes a plurality of pixels (pixels or sub-pixels) and a pixel driving element (a transistor, a capacitor, or the like). A pixel region may be defined as an area generated when a gate line GL and a data line DL intersect each other. In the liquid crystal display device 100, N gate lines GL and M data lines intersect to form M×N (sub) pixels. However, for the convenience of description, only two red sub-pixels R, two green sub-pixels G, and two blue sub-pixels B are illustrated in FIG. 1. The pixels of FIG. 1 are defined in the order of green sub-pixels G, green sub-pixels B, and red sub-pixels R on a plane.

The thin film transistor 130 is formed on the first substrate 110. The thin film transistor 130 is disposed corresponding to each sub-pixel R, G, or B. Each thin film transistor 130 includes a gate electrode 131, an active layer 132, a source electrode 133, and a drain electrode 134 which are formed on the first substrate 110. Specifically, the gate electrode 131 which is electrically connected to the gate line GL is formed on the first substrate 110. A gate insulating layer 121 is formed on the gate electrode 131. Further, the active layer 132 on which a channel is formed is formed on the gate insulating layer 121. The drain electrode 134 which is electrically connected to the data line DL and the source electrode 133 which is electrically connected to the pixel electrode 150 are formed on the active layer 132. The active layer 132 may be formed of amorphous silicon, polycrystalline silicon, or an oxide semiconductor.

A first planarization layer 122 is formed to cover the thin film transistor 130 on the first substrate 110. The first planarization layer 122 flattens an upper portion of the first substrate 110 on which the thin film transistor 130 is formed. The first planarization layer 122 may be formed of an organic insulating material having a low permittivity, such as photo-acryl (PAC), or the like. Even though not illustrated in FIG. 2, a separate insulating layer (passivation layer) may be formed on the thin film transistor 130 and the first planarization layer 122 may be formed on the insulating layer.

The common electrode 140 is formed on the first planarization layer 122. The common electrode 140 is an electrode to drive a liquid crystal layer (not illustrated). The common electrode 140 is formed in a region excepting a region where a contact hole is formed to electrically connect the pixel electrode 150 to the source electrode 133 of the thin film transistor 130, by a single pattern. Even though not illustrated in FIGS. 1 and 2, the common electrode 140 may be electrically connected to a common line which is disposed to be parallel to the gate line GL through a separate contact hole.

A second planarization layer 123 is formed on the common electrode 140. The second planarization layer 123 protects the common electrode 140 and flattens an upper portion of the common electrode 140. The second planarization layer 123 may be formed of the same material as the first planarization layer 122 or may be formed of an insulating material different from the first planarization layer 122.

The pixel electrode 150 is formed on the second planarization layer 123. The pixel electrode 150 is an electrode to drive the liquid crystal layer and is formed in each pixel with a box shape. Further, the pixel electrode 150 is formed on the second planarization layer 123 to have a plurality of slits. The pixel electrode 150 is electrically connected to the source electrode 133 of the thin film transistor 130 through the contact hole which is formed in the first planarization layer 122 and the second planarization layer 123. As illustrated in FIG. 1, the pixel electrode 150 may be formed such that a center part is bent at least once. The pixel electrode 150 and the common electrode 140 may be formed of a transparent conductive material.

In FIG. 1, it is illustrated that the pixel electrode 150 is formed with a box shape and has a plurality of slits and the common electrode 140 is formed by a single pattern. However, instead of the pixel electrode 150, the common electrode 140 may be formed to have a plurality of slits. Differently from FIG. 2, the common electrode 140 may be formed above the pixel electrode 150 or the pixel electrode 150 and the common electrode 140 may be disposed on the same layer.

The second substrate 115 is a color filter substrate of the liquid crystal display device 100 and is formed to be opposite to the first substrate 110. In the second substrate 115, the black matrix 180 which defines the (sub) pixel as a light shielding area and an aperture area. The black matrix 180 corresponds to a boundary of the pixel area and suppresses light leakage. The black matrix 180 is formed of an opaque material. That is, a region where the black matrix 180 is formed is defined as a light shielding area and a region where the black matrix 180 is not formed is defined as an aperture area. In the area corresponding to the light shielding area, various driving elements and wiring lines such as the thin film transistor 130, the data line DL, and the gate line GL are formed. In the area defined as the aperture area, the pixel electrode 150 and the common electrode 140 are formed.

On the second substrate 115 on which the black matrix 180 is formed, a plurality of color filters 190 is formed. Specifically, a red color filter 191, a green color filter 192, and a blue color filter 193 are formed to correspond to aperture areas of the red sub-pixel R, the green sub-pixel G, and the blue sub-pixel B, respectively. Some areas of the red color filter 191, the green color filter 192, and the blue color filter 192 may overlap the black matrix 180.

An overcoating layer 124 is formed on the second substrate 115 to cover the black matrix 180, the red color filter 191, the green color filter 192, and the blue color filter 193. The overcoating layer 124 is a layer to flatten a lower part of the second substrate 115 on which the black matrix 180, the red color filter 191, the green color filter 192, and the blue color filter 193 are formed. The overcoating layer 124 is formed of an insulating material. The overcoating layer 124 may be formed of the same material as the first planarization layer 122.

The column spacer 160 is formed between the first substrate 110 and the second substrate 115. The column spacer 160 maintains a cell gap of the liquid crystal display device 100. The column spacer 160 is formed in the light shielding area where the black matrix 180 is formed.

As illustrated in FIG. 2, the column spacer 160 is disposed to correspond to the light shielding area between the blue sub-pixel B and the red sub-pixel R. That is, the column spacer 160 is formed to overlap the data line DL formed in the light shielding area between the blue sub-pixel B and the red sub-pixel R and also overlap the black matrix 180.

In FIGS. 1 and 2, even though it is illustrated that the column spacer 160 is formed between the red sub-pixel R and the blue sub-pixel B, the column spacer is not limited thereto. The column spacer 160 may be formed between the red sub-pixel R and the green sub-pixel G or between the green sub-pixel G and the blue sub-pixel B.

A first alignment layer is formed on the second planarization layer 123 of the first substrate 110 and a second alignment layer may be formed on the overcoating layer 124 of the second substrate 115. The first alignment layer and the second alignment layer may be formed of polyimide (PI).

The liquid crystal layer may be interposed between the first substrate 110 and the second substrate 115. The liquid crystal layer is interposed between the second planarization layer 123 of the first substrate 110 and the overcoating layer 124 of the second substrate 115. Specifically, the liquid crystal layer may be interposed between the first alignment layer and the second alignment layer.

A backlight unit 170 which supplies light onto the liquid crystal layer of the liquid crystal display device 100 may be further provided.

Figure 3:
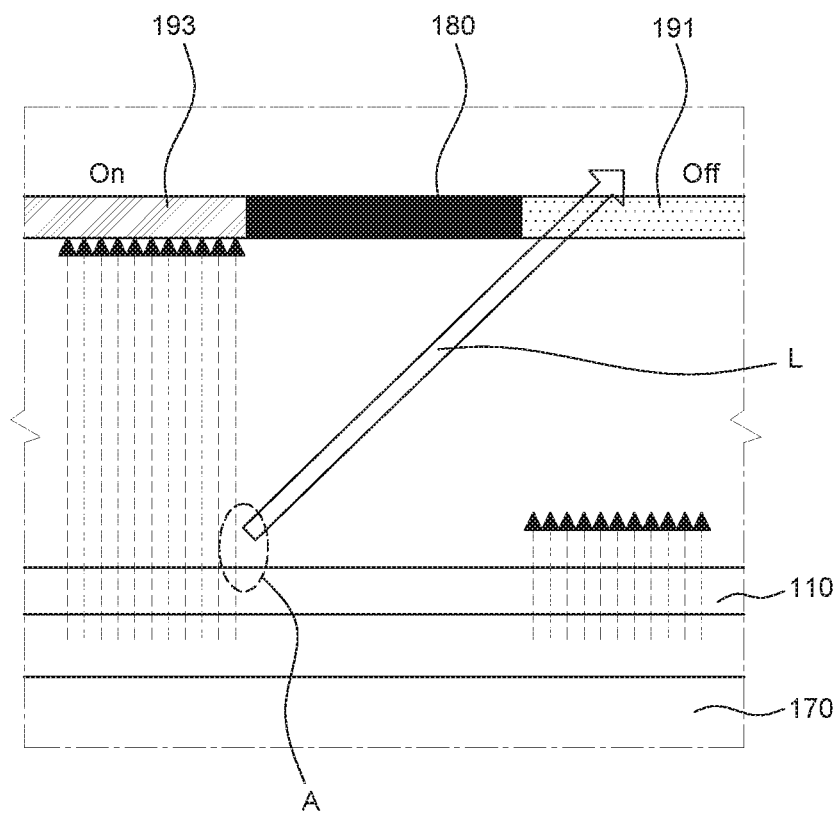
FIG. 3 is a view explaining a color mixture phenomenon which is generated in a liquid crystal display device.

FIG. 3 is a view explaining a color mixture phenomenon which is generated in a liquid crystal display device.

In the liquid crystal display device illustrated in FIGS. 1 and 2, the color filters 191 and 193 and the black matrix 180 is disposed on an upper substrate. According to this structure, color mixture phenomenon may occur between adjacent pixels which represent different colors.

Referring to FIG. 3, a white light is incident onto each sub-pixel from a light source (for example, the backlight unit 170) in the liquid crystal display device. A transmittance amount of the incident light is adjusted in accordance with a state of liquid crystal corresponding to each sub-pixel to be directed to the color filter. In this case, an electric field at an edge of each sub-pixel is interfered or distorted due to an electric field of adjacent pixels, which may change a traveling direction (an optical path) of the incident light. Light L whose path is changed is directed to the color filter of neighboring sub-pixels. When the black matrix 180 does not block the light, unintentional color may be represented. Such a phenomenon is also referred to as washout.

The color mixture phenomenon is frequently generated between a turned-on pixel 193 and a turned-off pixel 191. In other words, some of light incident onto the turned-on pixel 193 from the light source 170 is emitted through the turned-off pixel 191 to cause color mixture phenomenon. In this case, when the width of the black matrix 180 is increased (for example, 8 μm or larger), the color mixture phenomenon may be avoided. However, the aperture ratio may be lowered due to the increased width, so that it is difficult to apply a display device which has a high resolution and a high degree of integration.

Figure 4:
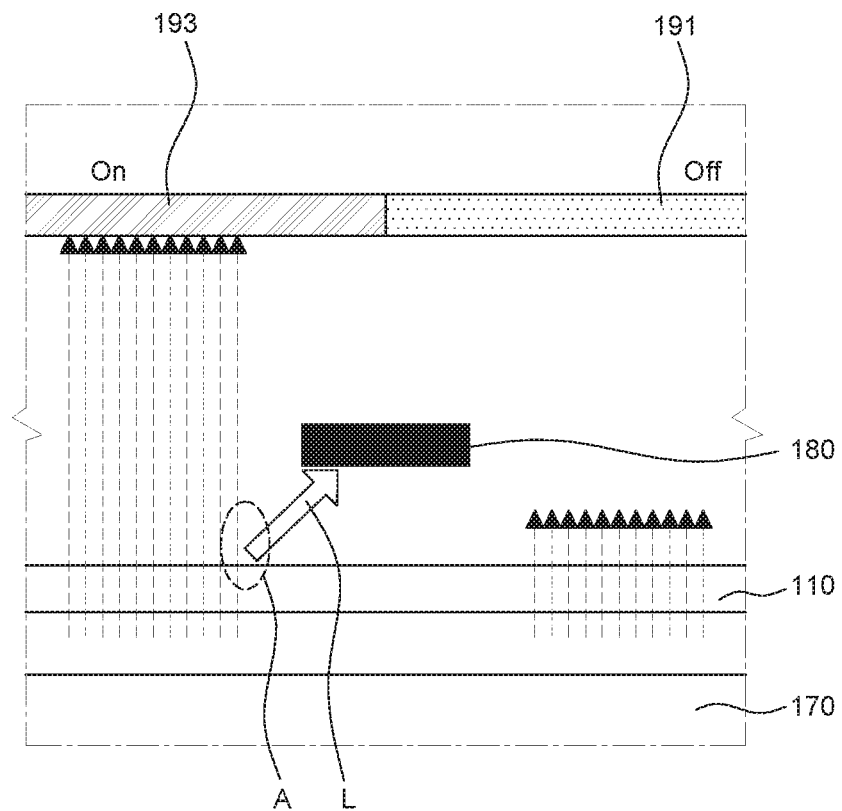
FIG. 4 is a view explaining a structure of a black matrix according to an exemplary embodiment of the present disclosure.

FIG. 4 is a view explaining a structure of a black matrix according to an exemplary embodiment of the present disclosure.

The structure of the black matrix is a structure for reducing the color mixture phenomenon described with reference to FIG. 3. The structure of the black matrix is characterized in that the black matrix 180 is located to be lower than that of the structure of FIG. 3. With this structure, the light L whose path is changed in the vicinity of the boundary between sub-pixels may be very effectively blocked. That is, the black matrix is located to be closer to an area which causes the optical path to be changed, so that the light which causes the color mixture is initially blocked.

In order to implement the above-described structure, the black matrix 180 may be located on the top of the TFT array substrate. When the cell gap is considered, the top of the TFT array substrate is a position which is the closest to the area which causes the optical path to be changed. If the black matrix is disposed on the color filter substrate, the black matrix may not be located to be closer to the area than the black matrix which is located on the TFT array substrate. An implementation example in which the black matrix is located on the TFT array substrate will be described in detail with reference to FIGS. 5A to 5C.

Figure 5A:
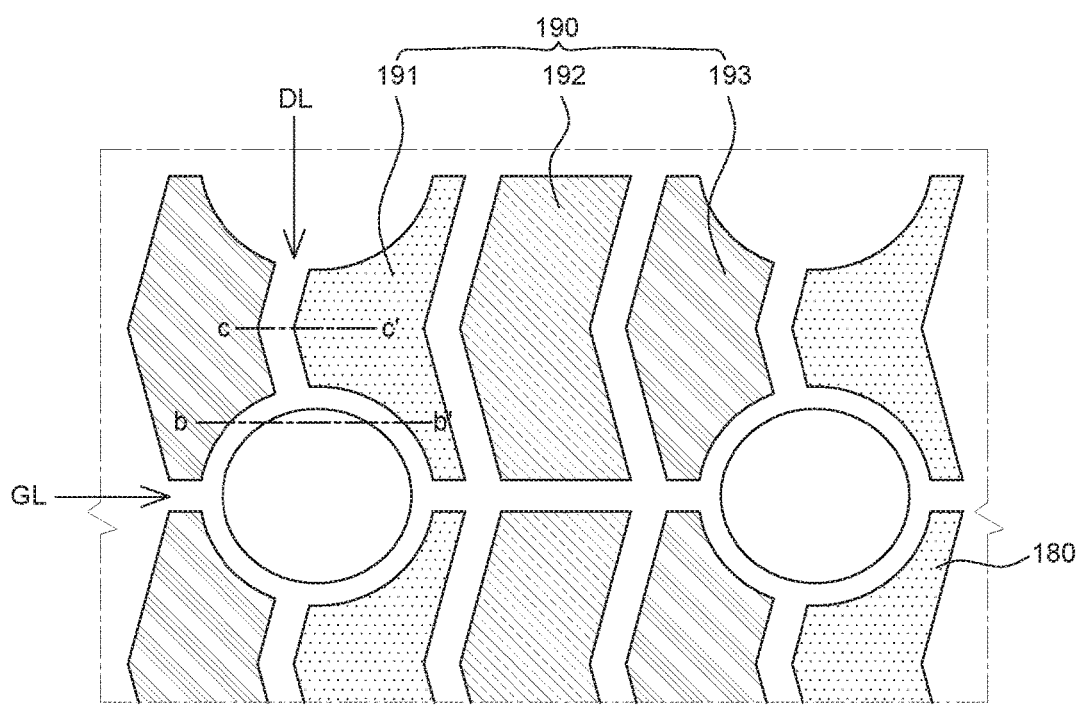
FIGS. 5A to 5C are plane views and cross-sectional views illustrating a liquid crystal display device according to an exemplary embodiment of the present disclosure.
Figure 5B:
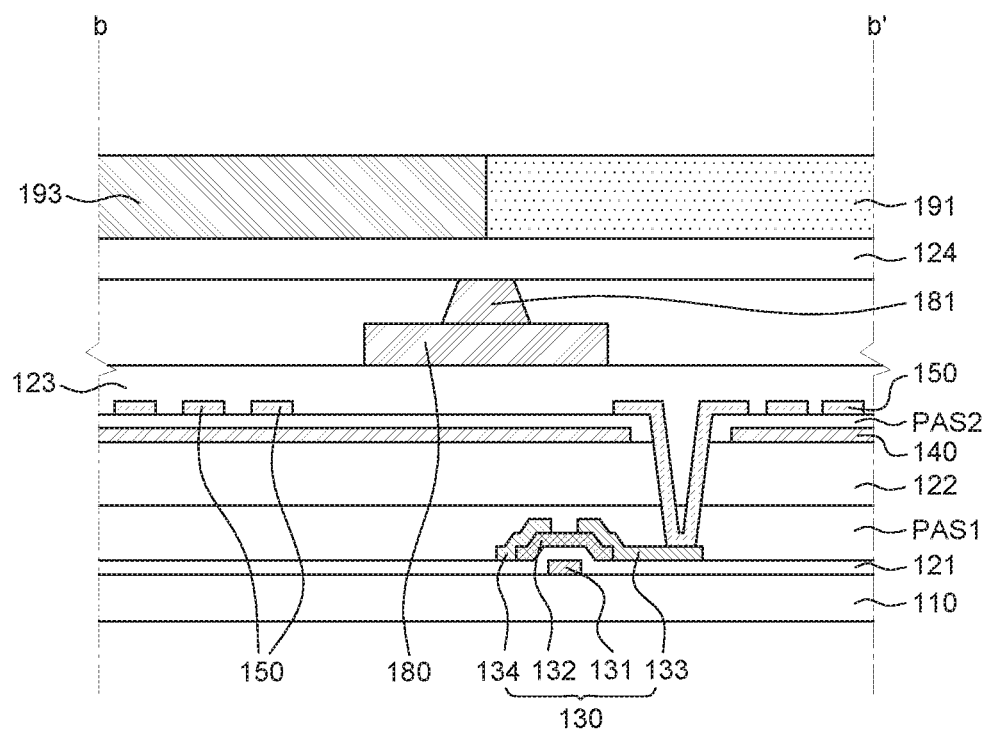
Figure 5C:
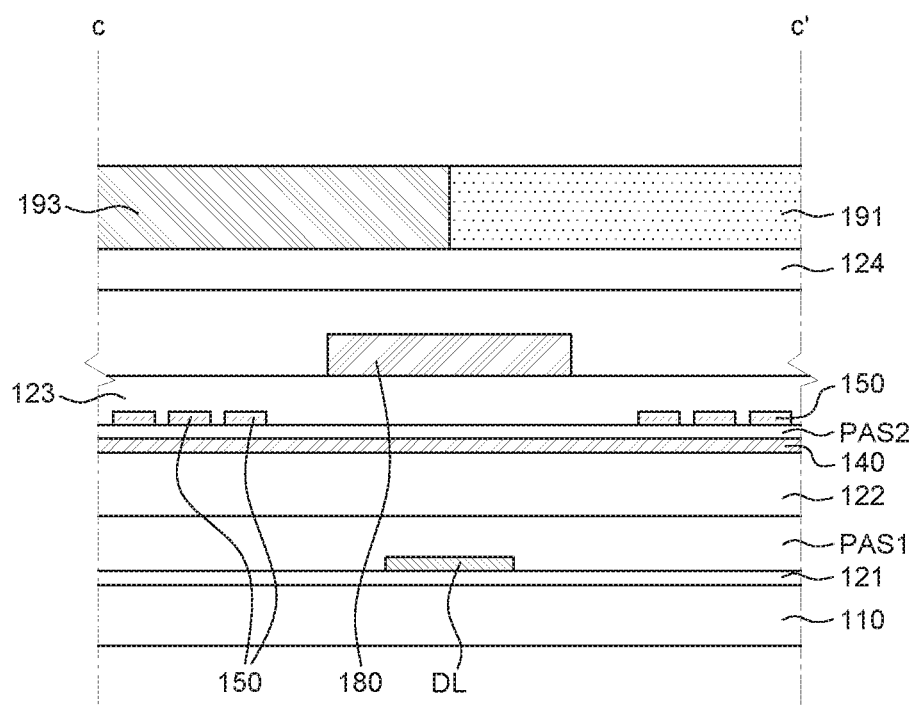

FIGS. 5A to 5C are plane views and cross-sectional views illustrating a liquid crystal display device according to an exemplary embodiment of the present disclosure.

Components of FIGS. 5A to 5C denoted by the same reference numerals as those in FIG. 2 are substantially same components, so that redundant description will be omitted.

The liquid crystal display device includes a color filter substrate, a thin film transistor (TFT) array substrate, and a liquid crystal layer between the two substrates. The color filter substrate includes a first sub-pixel which is provided to represent any one of red, green, and blue, a second sub-pixel which is adjacent to the first sub-pixel and is provided to represent a different color from that of the first sub-pixel, and a black matrix 180 which is provided between the first sub-pixel and the second sub-pixel and suppresses color mixture between the first sub-pixel and the second sub-pixel. In this case, the first sub-pixel and the second sub-pixel are a predetermined unit area which is defined on a plane of the display device and collectively refer to elements (a circuit, a color filter, or the like) involved to represent one color. The display device of FIGS. 5A to 5C may further include passivation layers PAS1 and PAS2 which serve as insulating layers on electric elements.

The black matrix 180 is included in the TFT array substrate. According to an exemplary embodiment, as illustrated in FIG. 5B, the black matrix 180 may be located above a transistor 130 involved to drive the first sub-pixel or the second sub-pixel. Therefore, it is possible to effectively block the light L whose path is changed in the vicinity of a boundary between sub-pixels, as illustrated in FIG. 4. More specifically, the black matrix 180 is located on the planarization layer 123. The planarization layer 123 is located above the transistor which is involved to drive the first sub-pixel or the second sub-pixel, on the TFT array substrate. The planarization layer 123 flattens a layer on which the electrode 140 or 150 involved to drive the first sub-pixel or the second sub-pixel is disposed. The planarization layer 123 may be an overcoating layer which flattens an upper portion of the electrode or a passivation layer.

Among light incident onto any one sub-pixel between the first sub-pixel and the second sub-pixel, the black matrix 180 may serve to block light leaked through any one sub-pixel. The black matrix 180 may block light leakage illustrated in FIG. 4, for example, light leakage (or color mixture) which is caused when any one of the first sub-pixel and the second sub-pixel is turned on and the other one is turned off. As described above, the black matrix 180 may block the leaked light when it is closer to a position where the light is leaked. Therefore, even though the black matrix 180 has a smaller width as compared to a case when the black matrix is disposed on the color filter substrate, the same effect may be achieved. Accordingly, the black matrix 180 may have a width which is determined based on an angle at which light, which is incident onto the turned-on sub-pixel in a first direction (for example, a vertical direction), travels in a different direction from the first direction at the boundary between the turned-on sub-pixel and the turned-off sub-pixel. For example, the black matrix 180 may have a width which may meet an extension line of light which is twisted at the most inner side, in the area (A in FIG. 4) where the traveling direction of the incident light is twisted.

In the meantime, the black matrix 180 is located on the top of the TFT array substrate, so that an additional function/structure may be further provided. That is, the black matrix 180 may further include a structure 181 to secure (maintain) an interval (cell gap) between the TFT array substrate and the color filter substrate. The structure 181 may be added on the black matrix 180 with a tapered shape, like the column space 160 of FIG. 2.

The structure 181 may be provided in a part of the black matrix 180, for example, in a part corresponding to a region where a data line extending in a DL direction intersects a gate line extending in a GL direction. Referring to FIG. 5A, it is known that a structure serving as a spacer is disposed in the vicinity of a position where the data line and the gate line intersect each other, as illustrated in FIG. 1.

The structure 181 may be formed of the same material as the black matrix 180. That is, the structure 181 may be formed of an opaque material, like the black matrix. Therefore, the structure 181 may be manufactured by a process (for example, a deposition process) for forming the black matrix on the TFT substrate. For example, when a black matrix pattern is deposited on the substrate, a specific area is formed to be thicker than the other area to manufacture the structure 181. When a multi tone mask (MTM) or a half tone mask (HTM) manner described above is used, the black matrix 180 and the spacer structure 181 may be manufactured by a single process using one mask. According to the structure of FIGS. 1 and 2, the black matrix is primarily patterned on the color filter substrate and then the column spacer 160 is secondarily patterned on the planarization layer 124. Therefore, two separate processes using two masks are required. In contrast, the black matrix 180 and the spacer structure 181 suggested in the present disclosure may be manufactured by an effective manufacturing process with a reduced number of masks and a reduced number of processes.

A position where the black matrix 180 and the spacer structure 181 suggested in the present disclosure are located on the TFT array substrate will be described in more detail. The TFT array substrate includes a supporting substrate (e.g., base layer) 110 and display elements 130, 140, and 150 which are disposed on the supporting substrate and is involved to display an image.

The black matrix 180 may be located on the top of the TFT array substrate, as illustrated in FIG. 5B (a cross-sectional view taken along the line b-b' of FIG. 5A) or FIG. 5C (a cross-sectional view taken along the line c-c' of FIG. 5A). For example, the black matrix 180 may be located on the planarization layer 124 which is disposed above the display element. In this case, the black matrix 180 is located in an area which divides the sub-pixels. The planarization layer 124 flattens upper portions of the display elements (driving elements) such as the transistor, the pixel electrode, and the common electrode. The pixel electrode and the common electrode may be located on the same layer and located on different layers. The planarization layer 124 refers to a layer which flattens an upper portion of an electrode which is located above the planarization layer. Among light which are incident onto any one sub-pixel from the light source 170, the black matrix 180 is provided to block light leaked through adjacent sub-pixel. A principle of blocking light which is leaked to the adjacent pixel is as described with reference to FIG. 4.

The spacer structure 181 is located on the black matrix 180. In this case, the spacer structure 181 may be also referred to as a column spacer. The spacer structure 181 may be patterned in a partial area of the black matrix 180. The spacer structure 181 serves to maintain a cell gap. The position of the spacer structure 181 may be determined in various positions. As one example, as illustrated in FIGS. 5A and 5C, the spacer structure 181 may be located in a region where the data line DL and the gate line are intersecting each other. Further, a height of the spacer structure 181 may be determined by a required cell gap.

The structure 181 may be formed of the same material as the black matrix. In this case, the spacer structure 181 may be manufactured by the same process as the black matrix 180 using a half tone mask.

As described above, according to an exemplary embodiment of the present disclosure, when the planarization layer is formed using a mask having at least one semi-transparent area corresponding to the pad area, a time for an ashing process to remove the planarization layer on the pad area is shortened. Therefore, a size of the first contact hole in the display area is suppressed from being significantly increased. Further, during an etching process of forming the first contact hole, the planarization layer in the pad area may reduce damage of an insulating layer in the pad area or a pad electrode. Therefore, a driving problem of the display device caused thereby may be reduced.

The exemplary embodiments of the present disclosure can also be described as follows:

According to an aspect of the present disclosure, a liquid crystal display device includes: a first sub-pixel configured to represent any one of red, green, and blue; a second sub-pixel adjacent to the first sub-pixel and configured to represent a different color from the first sub-pixel; and a black matrix disposed underneath along a boundary between the first sub-pixel and the second sub-pixel and configured to have a particular width that suppresses color mixture between the first sub-pixel and the second sub-pixel.

The black matrix is configured to block light leaked through one of the first sub-pixel and the second sub-pixel among light which are incident onto the other of the first sub-pixel and the second sub-pixel.

The black matrix may block the leaked light when any one of the first sub-pixel and the second sub-pixel is turned on and the other one is turned off.

The black matrix may have a width determined based on an angle to proceed differently to a first direction, which is incident onto a turned-on sub-pixel in a first direction, at a boundary between the turned-on sub-pixel and the turned-off sub-pixel.

The black matrix may be on a transistor which is involved to drive the first sub-pixel or the second sub-pixel, on the TFT array substrate.

The black matrix may be on a planarization layer that flattens a layer including an electrode configured to drive the first sub-pixel or the second sub-pixel on the TFT array substrate, and the planarization layer is on the transistor configured to drive the first sub-pixel and the second sub-pixel.

The planarization layer may be an overcoating layer which flattens an upper portion of the electrode.

In a partial area of the black matrix, wherein the structure is configured to secures an interval between the TFT array substrate and a color filter substrate may be further provided.

The structure may be disposed in a position corresponding to a region where a data line and a gate line intersect each other.

The structure may be formed of the same material as the black matrix by a process of forming the black matrix on the TFT substrate.

According to an aspect of the present disclosure, a thin film transistor (TFT) array substrate, includes: a supporting substrate; display elements disposed on the supporting substrate and provided to display an image; a planarization layer that flattens upper portions of the display elements; and a black matrix on the planarization layer and underneath along a boundary between two adjacent sub-pixels.

The black matrix may be configured to block light leaked through the other adjacent among light which are incident onto any one of sub-pixels from a light source.

The display element may include a thin film transistor, a pixel electrode, and a common electrode and the planarization layer may flatten an upper portion of an electrode which is disposed to be higher than the other, between the pixel electrode and the common electrode.

In a partial area of the black matrix, a column spacer for maintain a cell gap may be further provided.

The black matrix and the column spacer may be manufactured by the same process using a half tone mask.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A thin film transistor (TFT) array substrate, comprising:
   a supporting substrate;
   display elements disposed on the supporting substrate and provided to display an image;
   a planarization layer that flattens upper portions of the display elements; and
   a black matrix on the planarization layer and underneath along a boundary between two adjacent sub-pixels,
   wherein the display elements include a thin film transistor, a pixel electrode, and a common electrode, and the planarization layer that flattens an upper portion of one of the pixel electrode and the common electrode which is disposed higher than the other of the pixel electrode and the common electrode.

2. The TFT array substrate according to claim 1, wherein the black matrix is configured to block a portion of light leaked through one of sub-pixels from the light incident onto another of the sub-pixels from a light source.

3. The TFT array substrate according to claim 2, further comprising a column spacer for maintain a cell gap in a partial area of the black matrix.

4. The TFT array substrate according to claim 3, wherein the black matrix and the column spacer are formed by the same process using a half tone mask.

5. The TFT array substrate according to claim 1, wherein the black matrix is located closest to an area where a direction of light is changed considering a cell gap.

6. The TFT array substrate according to claim 5, wherein the direction of the light is changed due to an electric field of adjacent sub-pixel.

7. The TFT array substrate according to claim 1, wherein the black matrix is located on a top of the TFT array substrate.

8. The TFT array substrate according to claim 1, wherein the planarization layer is an overcoating layer or a passivation layer that flattens an upper portion of the pixel electrode or the common electrode.

9. The TFT array substrate according to claim 3, wherein the column spacer is disposed in a position corresponding to a region where a data line intersect with a gate line.

10. The TFT array substrate according to claim 3, wherein the column spacer is a tapered shape.

* * * * *